(12) United States Patent
Möller

(10) Patent No.: US 7,445,721 B2
(45) Date of Patent: Nov. 4, 2008

(54) REACTIVE FILTRATION

(75) Inventor: Gregory Möller, Moscow, ID (US)

(73) Assignee: Idaho Research Foundation, Inc., Moscow, ID (US)

( * ) Notice: Subject to any disclaimer, the term of this patent is extended or adjusted under 35 U.S.C. 154(b) by 184 days.

(21) Appl. No.: 11/171,002

(22) Filed: Jun. 29, 2005

(65) Prior Publication Data

US 2006/0000785 A1    Jan. 5, 2006

Related U.S. Application Data

(63) Continuation-in-part of application No. 10/727,963, filed on Dec. 2, 2003.

(60) Provisional application No. 60/583,979, filed on Jun. 30, 2004.

(51) Int. Cl.
*C02F 1/42*    (2006.01)

(52) U.S. Cl. .................... 210/760; 210/681

(58) Field of Classification Search ............... 210/760, 210/681
See application file for complete search history.

(56) References Cited

U.S. PATENT DOCUMENTS

| | | |
|---|---|---|
| 2,528,099 A | 10/1950 | Wilcox et al. |
| 2,696,462 A | 12/1954 | Bodkin |
| 2,730,239 A | 1/1956 | Peery |
| 2,863,829 A | 12/1958 | Henke et al. |
| 3,056,743 A | 10/1962 | Eichhorn et al. |
| 3,499,837 A | 3/1970 | Jaunarajs |
| 3,537,582 A | 11/1970 | Demeler |
| 3,619,425 A | 11/1971 | Palaiseau et al. |
| 3,674,684 A | 7/1972 | Gollan |
| 3,679,581 A | 7/1972 | Kunz |
| 4,003,832 A * | 1/1977 | Henderson et al. ......... 210/728 |
| 4,049,545 A | 9/1977 | Horvath |
| 4,126,546 A | 11/1978 | Hjelmner et al. |
| 4,145,280 A | 3/1979 | Middelbeek et al. |
| 4,269,716 A | 5/1981 | Gurian |
| 4,366,128 A | 12/1982 | Weir et al. |
| 4,732,879 A * | 3/1988 | Kalinowski et al. ............ 502/5 |
| 4,842,744 A | 6/1989 | Schade |
| 5,087,374 A | 2/1992 | Ding |
| 5,173,194 A * | 12/1992 | Hering, Jr. .................. 210/792 |
| 5,190,659 A * | 3/1993 | Wang et al. ................. 210/663 |
| 5,236,595 A * | 8/1993 | Wang et al. ................. 210/669 |
| 5,369,072 A * | 11/1994 | Benjamin et al. ............. 502/84 |
| 5,372,720 A | 12/1994 | Jonsson |
| 5,443,729 A | 8/1995 | Sly et al. |

(Continued)

FOREIGN PATENT DOCUMENTS

DE    27 24 254 A    11/1978

(Continued)

OTHER PUBLICATIONS

Beltran, "Heterogeneous Catalytic Ozonation," Ozone Reaction Kinetics for Water and Wastewater Systems, Chapter 10, Lewis Publishers, 2004, pp. 227-276.

(Continued)

*Primary Examiner*—Walter D. Griffin
*Assistant Examiner*—Cameron J Allen

(57) ABSTRACT

In one embodiment, a method for treating waste water includes passing ozonized waste water through a bed of moving sand.

11 Claims, 2 Drawing Sheets

U.S. PATENT DOCUMENTS

| | | |
|---|---|---|
| 5,454,959 A | 10/1995 | Stevens |
| 5,534,153 A | 7/1996 | Scott et al. |
| 5,670,046 A | 9/1997 | Kimmel |
| 5,676,257 A * | 10/1997 | Adkins ............................ 211/4 |
| 5,679,257 A * | 10/1997 | Coate et al. .................. 210/695 |
| 5,707,528 A | 1/1998 | Berry |
| 5,746,913 A | 5/1998 | Chang et al. |
| 5,755,977 A * | 5/1998 | Gurol et al. .................. 210/759 |
| 5,843,308 A | 12/1998 | Suozzo et al. |
| 5,876,606 A * | 3/1999 | Blowes et al. ................. 210/679 |
| 5,911,882 A * | 6/1999 | Benjamin et al. ............. 210/679 |
| 6,077,446 A * | 6/2000 | Steiner et al. ................. 210/760 |
| 6,132,623 A * | 10/2000 | Nikolaidis et al. ........... 210/719 |
| 6,143,186 A | 11/2000 | Van Unen |
| 6,200,482 B1 * | 3/2001 | Winchester et al. ......... 210/681 |
| 6,217,765 B1 | 4/2001 | Yamasaki et al. |
| 6,334,956 B1 | 1/2002 | Hanemaaijer |
| 6,426,005 B1 | 7/2002 | Larsson |
| 6,432,312 B1 | 8/2002 | Fuss |
| 6,464,877 B1 | 10/2002 | Mori et al. |
| 6,468,942 B1 | 10/2002 | Sansalone |
| 6,471,857 B1 | 10/2002 | Kaibara |
| 6,630,071 B1 | 10/2003 | Buisman et al. |
| 6,663,781 B1 | 12/2003 | Huling et al. |
| 6,716,344 B1 | 4/2004 | Bassi et al. |
| 6,942,786 B1 | 9/2005 | Fosseng |
| 6,942,807 B1 * | 9/2005 | Meng et al. .................. 210/719 |
| 7,029,589 B2 * | 4/2006 | McGinness .................. 210/758 |
| 2002/0077249 A1 * | 6/2002 | Schlegel et al. .............. 502/328 |
| 2004/0144728 A1 * | 7/2004 | Moller et al. ................. 210/688 |
| 2005/0127003 A1 | 6/2005 | Dennis |
| 2005/0173348 A1 | 8/2005 | Drake |
| 2006/0000784 A1 | 1/2006 | Khudenko |
| 2006/0000785 A1 | 1/2006 | Moller |
| 2007/0136919 P1 | 6/2007 | Bak et al. |

FOREIGN PATENT DOCUMENTS

| | | | |
|---|---|---|---|
| GB | 471 277 A | | 9/1937 |
| GB | 1596205 | | 8/1981 |
| JP | 03137990 | * | 6/1991 |
| JP | 2001-70954 | * | 3/2001 |
| WO | WO2004050561 | | 6/2004 |

OTHER PUBLICATIONS

Ravikumar, et al., "Chemical Oxidation of Chlorinated Organics by Hydrogen Peroxide in the Presence of Sand," Environ. Sci. Technol., 1994, 28, pp. 394-400.

U.S. Appl. No. 10/727,963 Non-Final Office Action dated Mar. 21, 2006.

U.S. Appl. No. 10/727,963 Non-Final Office Action dated Dec. 13, 2006.

U.S. Appl. No. 10/727,963 Non-Final Office Action Dated Jul. 24, 2007.

* cited by examiner

REACTIVE FILTRATION

CROSS REFERENCE TO RELATED APPLICATION

This application claims subject matter disclosed in provisional patent application Ser. No. 60/583,979 filed Jun. 30, 2004 now abandoned, entitled Reactive Filtration. This application is a continuation-in-part of co-pending patent application Ser. No. 10/727,963 filed Dec. 2. 2003, entitled Reactive Filtration.

BACKGROUND

Chlorine has historically been the chemical of choice in the treatment of water. More recent developments in the cost-effective generation of ozone and in the knowledge of undesirable environmental impacts of trihalomethanes and other chlorinated compounds have made ozone based water treatment an increasingly preferred treatment method.

DESCRIPTION

"Waste water" as used in this document means any water to be treated. Waste water is not necessarily highly contaminated water and may contain only trace amounts of phosphorus, arsenic, or other contaminants such as pesticides or pharmaceuticals (organic or inorganic compounds and in single or mixed solution) or disease causing organisms or molecules.

Figure 1:
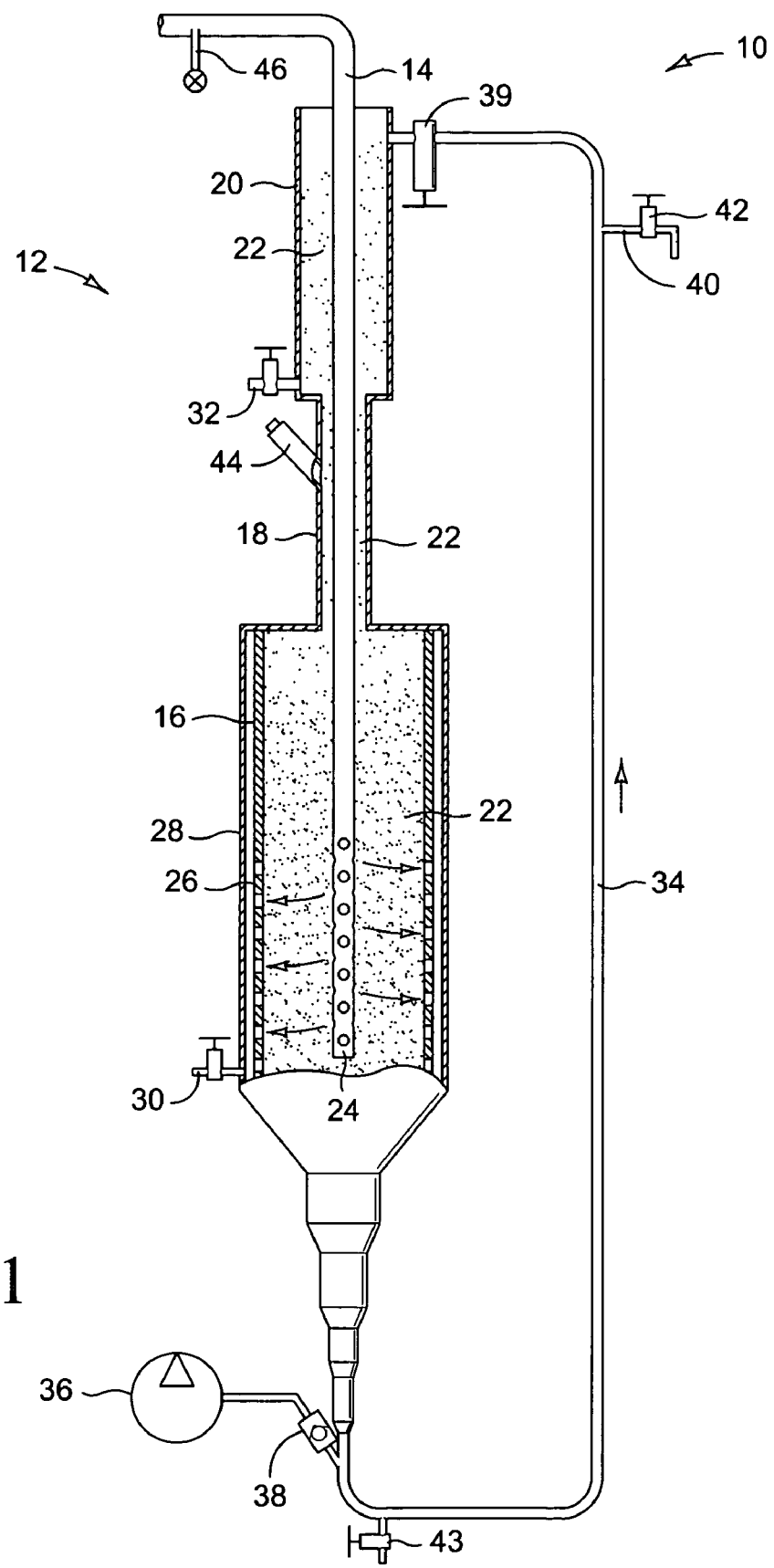
FIG. 1 illustrates a moving bed particle filtration system that may be used to implement various embodiments of the invention.

FIG. 1 illustrates a moving-bed particle radial filtration system 10 that may be used to implement embodiments of the invention. Referring to FIG. 1, waste water flows into a vertically oriented cylindrical treatment vessel 12 through an inlet pipe 14. Vessel 12 includes a filter chamber 16, a stem 18 and an expansion gravity settling chamber 20. Filter chamber 16 contains a bed of sand 22, iron oxide coated sand, sand and iron granules or another suitable filter media. Inlet pipe 14 extends down into filter chamber 16. Waste water is discharged into sand 22 along the perforated lower part 24 of inlet pipe 14. Treated water flows out of filter chamber 16 through a perforated outer perimeter 26 into a sleeve 28 and is removed from vessel 12 through an outlet pipe 30. The perforations in the lower part 24 of inlet pipe 14 and the outer perimeter 26 of filter chamber 16 are screened as necessary to prevent sand from passing through the perforations.

The comparatively narrow stem 18 of vessel 12 connects filter chamber 16 with expansion chamber 20. A sludge removal port 32 is positioned near the bottom of expansion chamber 20. A recirculation pipe 34 extends from the bottom of filter chamber 16 to the top of expansion chamber 20. An air compressor 36 pumps air into recirculation pipe 34 at the bottom of filter chamber 16 causing a counterclockwise motion of air, water, sand and filtered particulates through vessel 12. A back flow preventer 38, such as a flapper valve, prevents materials in recirculation pipe 34 from flowing back into compressor 36. A flow control valve 39, sampling tube 40, sampling valve 42 and clean-out 43 on recirculation pipe 34, and a sight glass 44 in stem 18, may be provided if necessary or desirable.

In operation, waste water pumped into filter chamber 16 through inlet pipe 14 passes radially through sand 22 into sleeve 28 and flows out outlet pipe 30 as treated water. Sand 22 moves continuously down through vessel 12 under the influence of gravity. An aerated mixture of used sand and water flows from the bottom of filter chamber 16 back up to expansion chamber 20 through recirculation pipe 34 along with contaminants removed from the waste water. Air is vented to the atmosphere at the top of expansion chamber 20 to prevent pressurization of the system. The pressure head of water in sand 22 is kept such that some of the treated water flows from filter chamber 16 up through stem 18 into expansion chamber 20 to rinse contaminants from the used sand particles returning to expansion chamber 20. This rinse water, now carrying a high concentration of contaminants less dense than sand, is removed from chamber 22 and flows out through sludge removal port 32. In a preferred operation, the top of the sand bed for filtration is three fourths the height of filter chamber 16. Expansion chamber 20 and narrow stem 18 contain a dilute sand and water mixture that contains filtered particles that have been moved first to the bottom of sand 22 and circulated via pipe 34 into the water residing in expansion chamber 20. Water flow at inlet pipe 14, outlets 30 and 32 and recirculation pipe 34 can be balanced so that a preferred rate of 5-10% of the inlet water carrying contaminants is discharged through sludge removal port 32.

The system of FIG. 1 may be used to implement embodiments of a new oxidation process for treating waste water. Ozone gas ($O_3$) is mixed with the waste water before the water passes through sand 22 at an ozone inlet port 46. Since ozone solubility in water is limited, mineral surfaces on the sand 22 adsorb ozone from the passing ozonized waste water. As used in this document, "ozonized" water means any mixture or other combination of water and ozone. The adsorption of ozone on the surface of sand 22 enhances reaction with oxidizible substances in the water. Since any oxidant will have preferred chemical reactivity, such as ozone attacking double bonded carbon, it is desirable to enhance the destructive pathways available to oxidizible contaminants by introducing or creating multiple oxidation pathways. The silica in typical sand acts as a reversible ozone sorption site and activated surface. Mineral oxides in the sand or adsorbed to the sand, such as iron oxide or manganese oxide, act as catalysts to convert ozone to reactive hydroperoxides. As water passes through sand 22, the surface reaction with sorbed ozone, hydroperoxides and other oxidative byproducts and hydroperoxides enhances the reactive solution chemistry of the dissolved ozone. This allows for surface reactions for oxidation of dissolved chemical compounds, enhanced disinfection via oxidative attack on microbial cell walls and cell constituents and the conservation of total oxidant loading via solid surface storage.

Embodiments of the process create and utilize a renewable, catalytic, oxidizing filter media that removes contaminants by filtering and by oxidation. Maximum oxidation of contaminants is combined with the particulate removal filtration properties of the moving sand 22. Ozone levels in the waste (port 32), treated water (port 30) and recirculation water (pipe 34) may be monitored to help optimize the amount of ozone introduced into the incoming waste water. Ozone is mixed with the waste water using any suitable gas-liquid mixing techniques, for example, contactors, diffusers or venturi effect mixers with headspace vented or vacuum pumped to prevent undesirable gas bubbles from entering the sand filter bed.

Deploying the sand or other suitable filter media in a moving bed assists in continuously renewing the ozone sorption sites as well as catalytic and activated surfaces. Movement may be accomplished, for example, by fluidizing or moving the bed using the fluid flow, by mechanical action such as augers or mixing bars, by acoustic action such as the application of ultrasonic waves or by physical transport using compressed air.

The application to the ozone containing water of ultrasonic energy for acoustic cavitation or pressure jets or diffusers for hydrodynamic cavitation may be desirable in some applications to form high energy, reactive oxidants including superoxide, hydroxyl radicals and peroxide. A reagent capable of creating a reactive surface on the filter media may be added to the incoming flow of waste water as necessary or desirable to assist in the removal of reactive contaminants such as dissolved organic matter and phosphorus. While it is expected that soluble forms of manganese, aluminum or other metals such as zinc and copper will provide suitable reagents, iron will typically be used as the reagent due to its proven reactivity with a variety of contaminants and its current widespread use in water treatment. Ferric chloride, for example, is a preferred reagent when phosphorus or arsenic is the target contaminant. Suspended iron-oxy-hydroxide particulates in the wastewater following the addition of ferric chloride also become catalytic surfaces for hydroperoxide formation from ozone. It is expected that the addition of ferric chloride or other fully oxidized metal salts will have minimal effect on the direct consumption of or competition for ozone.

Figure 2:
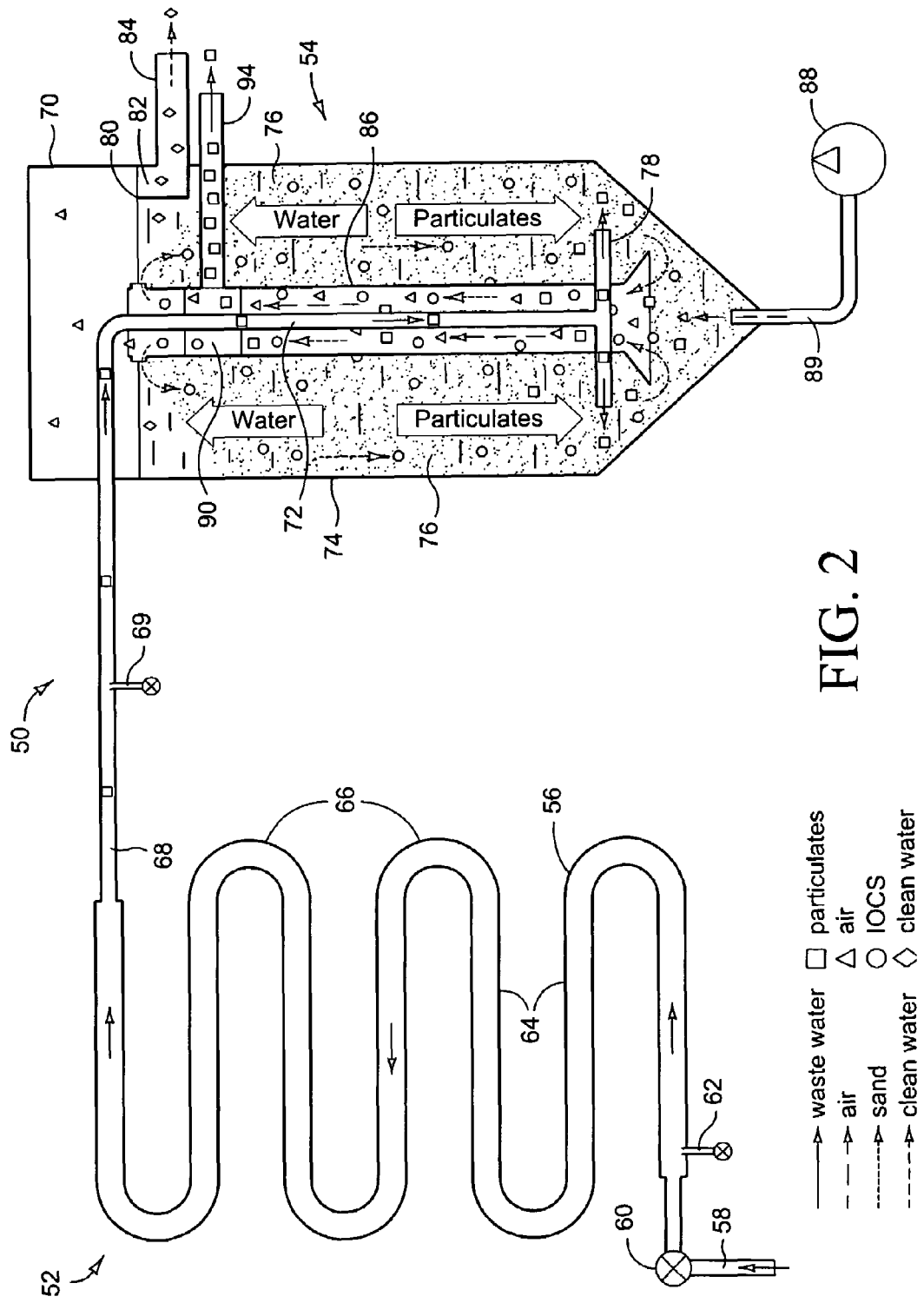
FIG. 2 illustrates a moving bed filtration system in which the waste water is pre-treated with a metal salt reagent before ozone is added to the waste water.

FIG. 2 illustrates a moving bed filtration system 50 in which the waste water is pre-treated with a metal salt reagent before ozone is added to the waste water. Referring to FIG. 2, filtration system 50 includes a pre-reactor system 52 and a reactive filter system 54. Waste water is pumped into the serpentine piping 56 of pre-reactor 52 through an inlet pipe 58 and flow control valve 60. A metal salt or other suitable reagent is introduced into serpentine piping 56 through a reagent inlet port 62 immediately downstream from inlet pipe 58. Preferably, serpentine piping 56 is substantially larger than inlet pipe 58 to slow the flow through piping 56 compared to inlet pipe 58. A slower flow increases the time available for the reagent to mix with the waste water and react with contaminants in the waste water. The waste water flow will be more turbulent near the transition from the smaller inlet pipe 58 to the larger serpentine piping 56. Introducing the reagent into this turbulent flow also helps mixing.

The waste water/reagent mix flows through straight-aways 64 and gentle bends 66 of serpentine piping 56. The waste water/reagent mix exits serpentine piping 56 into an outlet pipe 68 that takes the mix into reactive filter system 54. Prescribed dosing for the allotted reaction time introduces the reagent in sufficient quantities and concentrations to (1) allow for the co-precipitation and flocculation reactions between the reagent and the dissolved contaminants in pre-reactor system 52 to go to near completion to dilute levels as opposed to equilibrium and diffusion limited processes which limit further reaction, (2) saturate competing reactive pathways with natural waters with reagent, and (3) leave enough excess reagent in the mix to activate the filter media in reactive filter system 54. The amount of excess reagent is determined by the reactive capacity of the influent solution and the desire to deliver excess reagent to the sand filtration bed for the continuous formation of iron oxide coated sand that can catalytically react with ozone or be available for direct surface sorption or mineralization reactions with contaminants.

The comparatively slow flow through serpentine piping 56 allows for better coagulation of precipitates. The straight-aways 64 allow for less turbulent flow to enhance coagulation. Periodic gentle bends 66 introduce and maintain additional turbulent flow and introduce flow vortices to periodically mix the flowing solution. Preferably, the serpentine mixing array allows for a decrease in flow velocity for 2-8 minutes allowing for sufficient pre-reaction time. Design of the array needs to consider maintaining sufficient flow to prevent deposition of precipitation solids in the pre-reactor assembly. The actual length and diameter of serpentine piping 56 for most applications will result for an optimization of the required reaction time (usually 1-5 minutes), the desired flow rate, the space available at the site of deployment, and the presence of competing reactions in the treatment water.

Ozone is mixed with the pre-treated waste water at ozone inlet port 69 or alternately at the beginning of serpentine piping 56. This can be followed by venting or vacuum treatment of any headspace formed by excess gas from the ozonation process as large quantities of gas bubbles entering the sand filter are not desirable. The pre-treated ozonated waste water flows into the vertically oriented cylindrical treatment vessel 70 of reactive filtration system 54 through an inlet pipe 72. Inlet pipe 72 is positioned at the center of vessel 70. Vessel 70 includes a filter chamber 74 that contains a bed of sand 76 or another suitable filter media. Inlet pipe 72 extends down into filter chamber 74 to discharge the waste water into the lower portion of sand bed 76 through a perforated manifold 78. Waste water pumped into filter chamber 74 passes up through sand 76, over a baffle 80 near the top of filter chamber 74 as fully treated water, into a basin 82 and is removed from vessel 70 through an outlet pipe 84.

A recirculation tube 86 extends from the bottom to the top of filter chamber 74 at the center of vessel 70. Inlet pipe 72 extends down the center of recirculation tube 86. Inlet flow discharge manifold 78 extends out through openings in recirculation tube 86. An air compressor 88 pumps air into used sand and water at the bottom of vessel 70 through an air inlet pipe 89. The aerated mixture of used sand and water rises through recirculation tube 86 along with contaminants removed from the waste water up to a sand and particulate/water separator 90. Separator 90 represents generally any suitable separation device that may use, for example, physical separation, gravity separation, particle size separation, magnetic separation, membrane separation, or cyclonic separation. The sand removed from the mix by separator 90 is recycled back to filter chamber 74. The now highly contaminated waste water is removed through a sludge removal port 94. Sand 76 moves continuously down through vessel 70 under the influence of gravity.

Phosphorus exists in waters and waste waters as dissolved ortho-phosphate, polyphosphate and complex organic-phosphorus compounds. In typical phosphorus containing waste waters, such as the secondary or tertiary effluents of municipal waste water treatment plants, there is a dissolved fraction, primarily as ortho-phosphate ($PO_4^{3-}$) and poly-phosphates and as a micro-particulate or suspended fraction of phosphoros containing solids. Trace levels of arsenic are sometimes found in some sources of drinking water and in higher concentrations in some waste waters. Arsenic can occur in natural waters in the reduced arsenite, As(III) or oxidized arsenate, As(V) forms. Arsenate reacts with iron and aluminum salts to form insoluble compounds. Waters with arsenite contamination can be treated with an oxidizer such as chlorine to allow for further reaction with reactive metal salts. Ferric chloride or sulfate is typically used as a metal salt reagent to remove phosphorus and arsenic from water, although other salts and ferrous compounds can be used. These metal salts can react with other contaminants in solution either by physical means (coagulation, flocculation) or by direct or indirect chemical reaction.

In the system described above, excess ferric iron enters sand bed 76 along with the particulate Fe—As or Fe—P solids and residual As or P in solution in the waste water. Ferric ions react with sand surfaces to form iron oxide coated sand (IOCS). IOCS sorbs residual solution As/P out of solution. The physical action of the moving sand abrades the surface of the sand granules, refreshing active sites for additional IOCS formation and Fe—As or Fe—P reactions. Hence, fresh reactive sites for As/P binding are continually presented to the flowing water via microscopic erosion of the sand surface. The ozone will oxidize any reduced As(III) to As(IV) making it more reactive with iron compounds. Ozone and the related solution oxidants will also destroy organic contaminants and lead to disinfection.

Chemical and microbial contamination enters water through natural and anthropogenic means and removing such contamination makes water suitable for a variety of uses including drinking water and return of wastewater to natural water bodies. Oxidation can convert contaminating chemical compounds to their mineralized forms such as the products of carbon dioxide and water from hydrocarbon chemicals. Applying simultaneous multiple oxidation modes such as ozonation, metal oxide catalytic ozonation, surface adsorbed ozonation and ultrasonic or hydrodynamic cavitation with ozone can increase the total number and chemical diversity of the oxidants available thus increasing the likelihood of complete mineralization, even for recalcitrant or refractory compounds. This has direct application reducing the concentration of highly toxic or highly bioactive substances in water via enhanced oxidation. Examples of highly bioactive substance in wastewater are pharmaceuticals and hormonally active compounds. Concomitantly, the enhanced oxidation has the desirable effect of enhancing the completeness of disinfection of water contaminated with infectious disease agents such as bacteria and viruses.

U.S. patent application Ser. No. 10/727,963 filed Dec. 3, 2003 describes reactive filtration materials and processes that can be used with the ozone treatment described above. The disclosure in application Ser. No. 10/727,963 is, therefore, incorporated herein by reference in its entirety.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method for treating wastewater comprising:
   dissolving ozone in wastewater in the presence of dissolved and suspended metal oxy-hydroxide catalysts formed from the addition of metal salt reagents to the wastewater, wherein the dissolved and suspended metal oxy-hydroxide catalysts initiate conversion of the dissolved ozone into diverse reactive oxidative byproducts able to react through multiple oxidative pathways with dissolved or suspended contaminants, the dissolved ozone and dissolved and suspended metal oxy-hydroxide catalysts being sufficient to provide excess metal oxy-hydroxide catalysts, dissolved ozone and associated reactive oxidative byproducts to a bed of moving sand; and,
   passing the excess metal oxy-hydroxide catalysts, dissolved ozone, associated reactive oxidative byproducts and wastewater through the bed of moving sand sufficient to continue to oxidize contaminants and to continuously form catalytic metal oxide coated sand surfaces within the bed to allow further catalytic oxidation of dissolved or suspended contaminants.

2. The method of claim 1, wherein the passing causes the dissolved or suspended contaminants to adhere to the metal oxide coated sand surfaces.

3. A method comprising:
   adding excess metal salt reagent and excess ozone to wastewater sufficient to create a partially reacted mixture of dissolved ozone, reactive oxidative byproducts of ozone, dissolved and suspended metal oxy-hydroxide catalysts, and wastewater;
   facilitating oxidation of dissolved and suspended contaminants in the partially reacted mixture; and,
   supplying the partially reacted mixture to a bed of moving sand.

4. The method of claim 3, wherein the facilitating comprises extending a duration of reaction and mixing time before the partially reacted mixture is supplied to the bed of moving sand.

5. The method of claim 3, wherein the facilitating comprises energizing the partially reacted mixture with acoustic or hydrodynamic cavitation before the partially reacted mixture is supplied to the bed of moving sand.

6. The method of claim 3, wherein the facilitating comprises flowing the partially reacted mixture through a pre-reactor assembly for a predetermined reaction time.

7. The method of claim 3, wherein the facilitating comprises flowing the partially reacted mixture through a pre-reactor assembly for a predetermined reaction time while simultaneously energizing the partially reacted mixture.

8. The method of claim 3, further comprising prior to said supplying, removing gas bubbles from the partially reacted mixture.

9. The method of claim 3, further comprising monitoring ozone concentrations in the partially reacted mixture.

10. The method of claim 3, further comprising monitoring ozone concentrations in effluent produced by the bed of moving sand from the partially reacted mixture.

11. The method of claim 10, wherein the monitoring comprises optimizing an amount of ozone added to the wastewater while minimizing ozone and reactive oxidative byproduct concentrations in the effluent.

\* \* \* \* \*